Jan. 5, 1971     T. G. FRANZREB     3,551,934
AIRCRAFT SKIN CLEANING MAINTENANCE
Filed Sept. 26, 1968     3 Sheets-Sheet 1

INVENTOR.
THOMAS G. FRANZREB
BY White & Haefliger
ATTORNEYS.

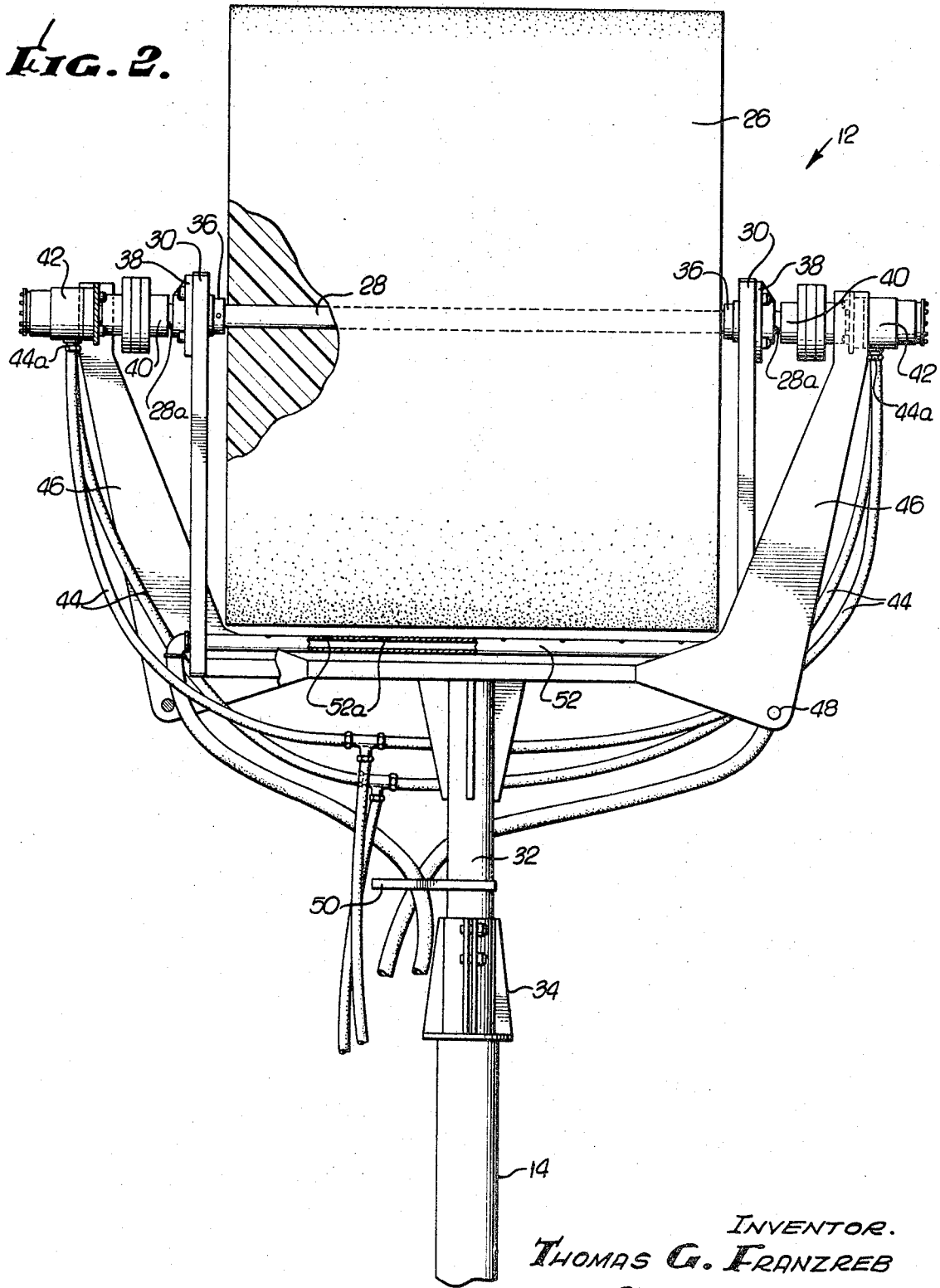

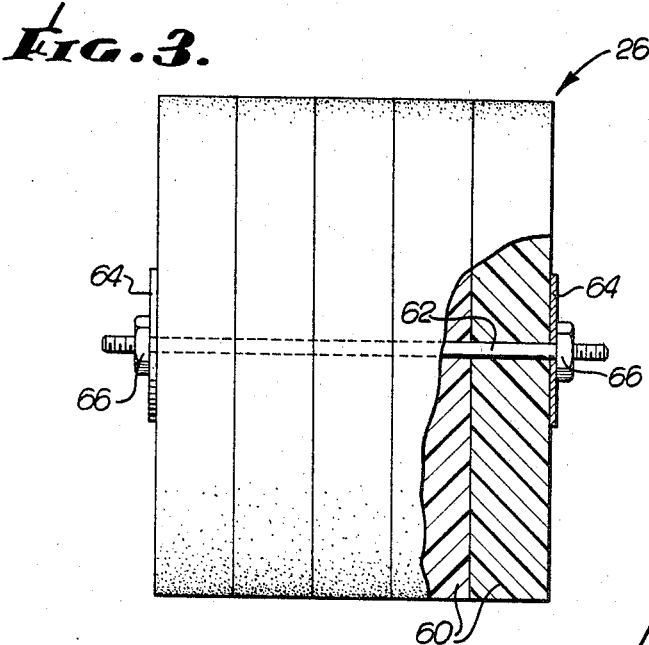
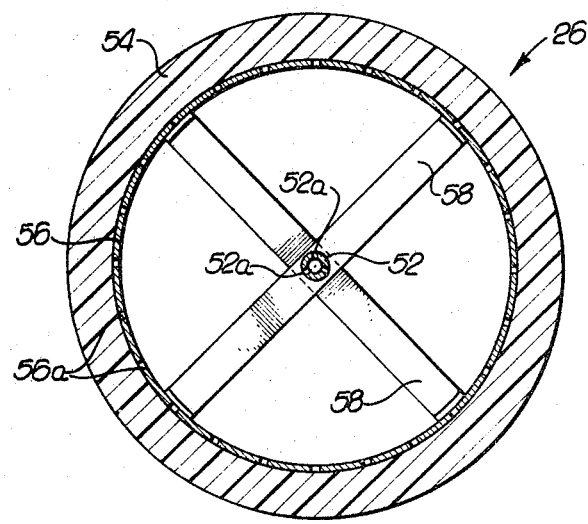
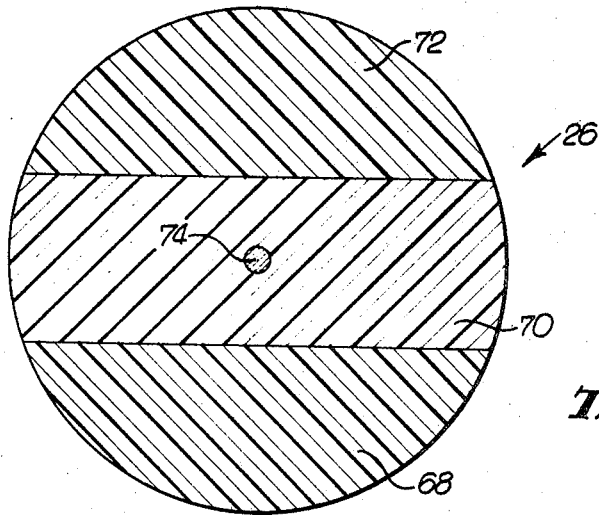

United States Patent Office 3,551,934
Patented Jan. 5, 1971

3,551,934
AIRCRAFT SKIN CLEANING MAINTENANCE
Thomas G. Franzreb, Rolling Hills, Calif., assignor to Purex Corporation, Ltd., Lakewood, Calif., a corporation of California
Filed Sept. 26, 1968, Ser. No. 762,767
Int. Cl. B64f 5/00
U.S. Cl. 15—97                12 Claims

ABSTRACT OF THE DISCLOSURE

The efficient cleaning of aircraft aluminum skin surfaces without abrading or scratching is realized through the use of a polyurethane foam roller loaded with liquid detergent which is rotatively applied to the skin surface from a ground location through mounting of the roller on a boom.

BACKGROUND OF THE INVENTION

(1) Field of the invention

Aircraft maintenance is a continuing task and because appearance is of vital importance aircraft exteriors are frequently washed as part of a maintenance program. As technology progresses, aircraft skins, the exterior covering of the aircraft, have evolved into aluminum alloys of sophisticated composition and formation. Scratches in skin parts can destroy the corrosion impervious character of aluminum as well as detract from the esthetic appeal of the aircraft.

New and proposed aircraft are even larger than their predecessors, to the point today that former washing techniques, mainly manual, are fast becoming uneconomical and obsolete. The tail assembly of the new 747 aircraft, for example, is as tall as a DC-3 is long. Manual methods are simply too slow for the vast areas to be covered during the limited between-flight times available.

Mechanical cleaning thus is desirable for its speed and convenience in reaching all parts of the aircraft.

(2) Prior art

While no cleaning devices are presently known to exist directed to the problem under discussion, various truck mounted platforms, capable of applying a mechanical scrubber to an aircraft are available for unrelated purposes.

The problem, however, is not the achieving of placing a mechanized scrubber at any place on the aircraft skin, but rather how to achieve scrubbing with such devices without injuring the skin itself.

Brushes of either natural or synthetic fiber and foams of other substances have been found to be too aggressive on aircraft aluminum alloys and to scratch the same.

SUMMARY OF THE INVENTION

It is a major objective of the present invention to provide for exterior cleaning maintenance of aircraft without abrasive deterioration of the aircraft skin.

Broadly the invention realizes this and other objectives through a scrubbing device for cleaning the polished aluminum skin of an aircraft which includes a mobile cleaning head mounted to be moveable from the ground to all skin surfaces of the aircraft and a supply of detergent containing cleaning liquid to the cleaning head. The cleaning head includes means for foaming and carrying the cleaning liquid to the skin surfaces comprising a cleaning liquid absorbing polyester urethane foam body which is sequentially compressible against the aircraft skin to foam and expel cleaning liquid against the aircraft skin surfaces as the body moves in scrubbing contact across the skin surface.

BRIEF DESCRIPTION OF THE DRAWINGS

FIG. 2 is a plan view, greatly enlarged, of a cleaning head of the scrubber device according to the invention, partly broken away to show underlying parts;

FIG. 3 is a view in elevation of a modification of the foam body shown in FIG. 2; and FIGS. 4 and 5 are further modifications, shown in section, of the foam body.

DESCRIPTION OF THE PREFERRED EMBODIMENTS

Figure 1:
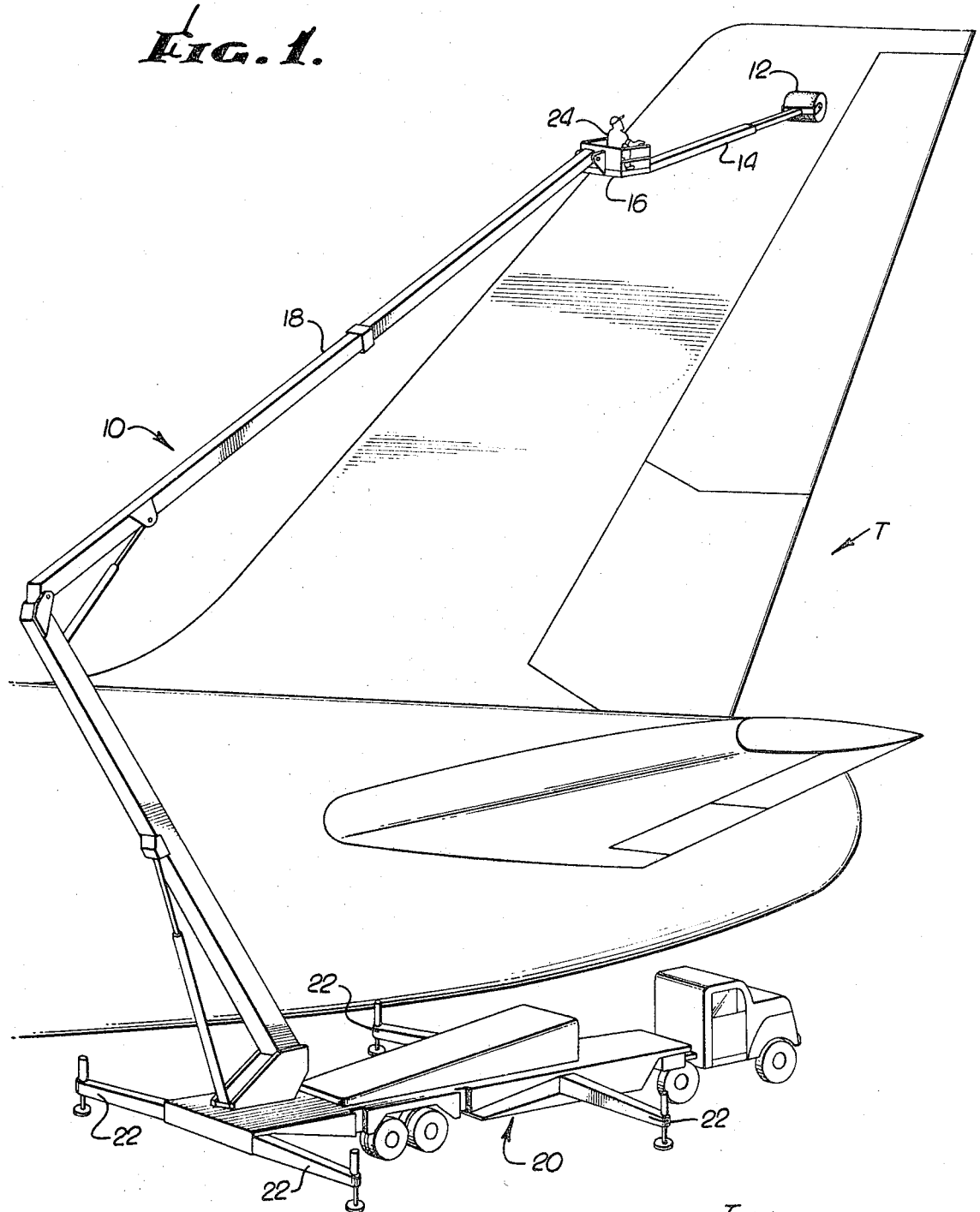
FIG. 1 is a perspective view of the present scrubbing device, truck mounted and in use for washing the tail assembly of a large commercial aircraft.

Turning to the drawings in FIG. 1 aircraft tail assembly T is shown being cleaned with a scrubbing device 10 including a cleaning head 12. The cleaning head 12 is carried for universal movement on retractible arm 14 extending from control platform 16 which in turn is carried on articulated boom 18 rising from the rear of truck 20 provided with stabilizers 22.

In practice the truck 20 is located conveniently and the boom 18 operated to bring the cleaning head 12 into close proximity to e.g. the aircraft tail assembly T. Close adjustment is made through operation of arm 14 which is moveable vertically, in and out and rotates. An operator 24 may be placed on control platform 16 or all control may be at ground level.

In FIG. 2, the cleaning head 12 is shown to include a polyester urethane foam body 26 typically and as shown cylindrical in form, having a drive shaft 28 extending coaxially therethrough. The shaft 28 is journaled in arms 30 of a foam body support, fork 32, which is coupled at 34 to arm 14 from the control platform by means of which the foam body 26 is moved toward and away from the aircraft, and moved and oriented horizontally and vertically. The foam body 26 projects outwardly about one-half its diameter providing a thick scrubbing pad which minimizes bumping and denting of aircraft skin with arms 30 and which contributes to the compression-agitation aspects of the device. Foam body 26 is maintained properly spaced within fork arms 30 by collars 36 on either side thereof inboard of the arms. Outboard of the arms 30 flanged bearings 38 carry the ends 28a of shaft 28. A flexible couple 40 connects the shaft ends 28a to the output shafts (not shown) of hydraulic motors 42. Hydraulic fluid hose 44 are connected with threaded collars 44a to the motors 42 for operating the same. These hoses 44 are trained between the motor mounting plate 46 inward of pin 48 and through hose guide 50 to the control platform 16.

Cleaning liquid containing detergent and aqueous and/or organic solvent materials from a supply tank (not shown) is distributed onto the foam body 26 from manifold 52, a pipe section having distributed openings 52a opposite the foam body along the length thereof and mounted behind the foam body and between the fork arms 30.

As shown in FIG. 4, the manifold 52 can be used as a drive shaft. In the FIG. 4 embodiment, the foam body is in the form of a cylindrical wall 54 formed around a perforate drum 56 having apertures 56a which permit cleaning liquid delivered to the drum interior to pass outwardly through the drum wall and into the foam body. The drum 56 is supported with cross-pieces 58 journaled on the combination shaft and manifold 52. The thickness of the foam wall 54 should be great enough to minimize inadvertent denting of an aircraft skin through too close passing of the drum 56 to the aircraft skin.

In FIGS. 3 and 5 there are depicted less costly arrangements of foam into appropriately sized bodies for large area cleaning than the integral block shown in FIG. 2. In FIG. 3 discs 60 are stacked sideways and fastened along a common axis with a shaft 62 which is threaded at either end to mount end plates 64 held in place with nuts 66. In FIG. 5 conventional rectangular blocks of foam 68, 70 and 72 have been superimposed and bonded together face to face and then cut into a cylinder shape by lengthwise trimming. A central shaft 74 passes through the center block 70 for rotation purposes as in other embodiments.

The polyester urethane foam body is formed of commercially available materials by techniques now well known in the art. It is preferred that the cell structure be open and relatively coarse, e.g., not more than 100 pores per linear inch (p.p.i.) and preferably fewer than 25 p.p.i. Ten pores per linear inch is a typical maximum coarseness.

In this invention the uniquely useful properties of polyester urethane foam for aircraft skin cleaning are first realized. These foams have been found to be nonscratching to polished aluminum. In addition these foams have excellent abrasion resistance for long wear life, they are strong, lintless, washable, inert to detergents and aircraft fluids and fuels. Moreover, these foams are resilient and compressibly soft for ready conformation to intricate curvatures without buckling, denting, abrading, bending or otherwise damaging the aircraft skin. As opposed to bristle brushes, foam block as taught in this invention has no bristles to break off, tear out or throw the spinning scrubber out of balance; provides effective squeegee action over all of its width and not merely on the traverse paths of bristle tips; avoids whipping action; and acts as a reservoir for cleaning liquid.

A further advantage of the foams taught herein is the foaming agitation given the cleaning liquid by the continuing compression and decompression of the foam as it passes deflectively by the aircraft skin while saturated with cleaning liquid. The foam body thus expels a foam onto the aircraft surface for maximum cleaning effect. In this manner detergent containing liquid absorbed by the foam body 26 from the manifold 52 is subjected to periodic agitation as the body is sequentially compressed and permitted to expand in correspondence to engagement or not with the aircraft skin.

In a typical case the foam body will be 6 to 42 inches in diameter and 48 inches in length and will be used singly or in gangs which may be articulated for simultaneous washing of multiple plane surfaces.

I claim:

1. Scrubbing device for cleaning the polished aluminum skin of an aircraft including a mobile cleaning head mounted to be moveable to all skin surfaces of the aircraft and means to supply cleaning liquid to the cleaning head, said cleaning head including means for foaming and carrying said cleaning liquid to the skin surfaces comprising a cleaning liquid absorbing polyester urethane relatively coarse foam body having fewer than 100 pores per linear inch to be sequentially compressible against the aircraft skin to foam and expel cleaning liquid against the aircraft skin surfaces as the body moves in scrubbing contact across the skin surface.

2. Scrubbing device according to claim 1 in which said foam body is generally cylindrical and including also means for rotating said body about its long axis.

3. Scrubbing device according to claim 2 including also cleaning liquid delivery means for delivering liquid to the foam body during rotation thereof.

4. Scrubbing device according to claim 1 in which said cleaning head includes arms for supporting a substantial portion of said foam body in outward projection for cleaning application to the aircraft skin and said supply means includes a supply of detergent containing liquid in communication with the cleaning head.

5. Scrubbing device according to claim 4 including also shaft means supported by said arms, said foam body being supported on said shaft for movement therewith, and means for driving said shaft.

6. Scrubbing device according to claim 5 including also a manifold for distributed delivery of cleaning liquid to said foam body from said supply.

7. Scrubbing device according to claim 6 in which said foam body is cylindrical and rotatable on its axis about said shaft.

8. Scrubbing device according to claim 7 in which said liquid delivery manifold extends axially along said cylindrical foam body remote to the outwardly projecting portion of said body.

9. Scrubbing device according to claim 1 in which said foam body has fewer than 25 pores to the linear inch.

10. Scrubbing device according to claim 9 in which said foam body is an integral foam block.

11. Scrubbing device according to claim 9 in which said foam body comprises a plurality of foam discs fastened together along a common axis.

12. Scrubbing device according to claim 9 in which said foam body comprise a plurality of generally rectangular foam blocks fastened in parallel face-to-face arrangement.

References Cited

UNITED STATES PATENTS

| | | | |
|---|---|---|---|
| 2,857,606 | 10/1958 | Sperka | 15—98 |
| 2,932,844 | 4/1960 | O'Connor | 15—98X |
| 3,099,852 | 8/1963 | Grant | 15—21(C.O) |
| 3,336,622 | 8/1967 | Kullwitz et al. | 15—97X |
| 3,439,372 | 4/1969 | Collier | 15—21(O) |

EDWARD L. ROBERTS, Primary Examiner

U.S. Cl. X.R.

15—21